(12) United States Patent
Jung et al.

(10) Patent No.: US 9,049,654 B2
(45) Date of Patent: Jun. 2, 2015

(54) OFDM-BASED MULTIPLE ACCESS METHOD AND COMMUNICATION DEVICE CONTROLLING THE SAME

(75) Inventors: Jun woo Jung, Suwon-si (KR); Jae sung Lim, Suwon-si (KR)

(73) Assignee: AJOU UNIVERSITY INDUSTRY-ACADEMIC COOPERATION FOUNDATION, Suwon-Si, Gyeonggi-Do (KR)

( * ) Notice: Subject to any disclaimer, the term of this patent is extended or adjusted under 35 U.S.C. 154(b) by 137 days.

(21) Appl. No.: 13/816,453

(22) PCT Filed: Aug. 20, 2010

(86) PCT No.: PCT/KR2010/005524
§ 371 (c)(1),
(2), (4) Date: Feb. 11, 2013

(87) PCT Pub. No.: WO2012/020873
PCT Pub. Date: Feb. 16, 2012

(65) Prior Publication Data
US 2013/0142179 A1 Jun. 6, 2013

(30) Foreign Application Priority Data
Aug. 12, 2010 (KR) ........................ 10-2010-0077862

(51) Int. Cl.
*H04B 7/208* (2006.01)
*H04W 56/00* (2009.01)
(Continued)

(52) U.S. Cl.
CPC ............. *H04W 56/00* (2013.01); *H04L 5/0037* (2013.01); *H04L 5/0044* (2013.01); *H04L 5/0062* (2013.01); *H04L 27/2689* (2013.01); *H04W 74/00* (2013.01)

(58) Field of Classification Search
CPC . H04L 5/0037; H04L 5/0044; H04L 27/2689; H04L 5/0062; H04W 74/00; H04W 56/00
USPC .......... 370/335, 336, 337, 328, 329, 343, 344
See application file for complete search history.

(56) References Cited

U.S. PATENT DOCUMENTS 7,869,809 B2 * 1/2011 Qi et al. ......................... 455/445
2009/0190535 A1 * 7/2009 Hassan et al. .................. 370/329
(Continued)

FOREIGN PATENT DOCUMENTS

KR 2002-0064939 8/2002
KR 10-2005-0045943 5/2005
(Continued)

OTHER PUBLICATIONS

PCT Written Opinion of the International Searching Authority for International Application No. PCT/KR2010/005524, dated Aug. 26, 2011.
(Continued)

*Primary Examiner* — Chuong T Ho
(74) *Attorney, Agent, or Firm* — Kile Park Reed & Houtteman PLLC (57) ABSTRACT

An OFDM-based multiple access method and a communication device controlling the same are provided. The OFDM-based multiple access method includes transmitting a predetermined synchronization control signal to many and unspecified terminals, and receiving a test message from the terminals in response to the synchronization control signal; classifying the terminals that receive the test message in a first unit time from a predetermined reference time after the transmission of the synchronization control signal into a first group, and classifying the terminals that receive the test message in a certain n-th unit time from the reference time into an n-th group; allocating use permission time of sub-channels to the groups; and the terminals transmitting/receiving data through partial occupation of the sub-channels and symbols at a time allocated to the corresponding groups.

8 Claims, 7 Drawing Sheets (51) Int. Cl.
*H04L 5/00* (2006.01)
*H04L 27/26* (2006.01)
*H04W 74/00* (2009.01)

(56) References Cited

U.S. PATENT DOCUMENTS

| | | | |
|---|---|---|---|
| 2010/0097946 A1* | 4/2010 | Celentano et al. | 370/252 |
| 2010/0309853 A1* | 12/2010 | Richardson et al. | 370/329 |
| 2013/0155980 A1* | 6/2013 | Hassan et al. | 370/329 |
| 2013/0215802 A1* | 8/2013 | Hao et al. | 370/280 |

FOREIGN PATENT DOCUMENTS

| | | |
|---|---|---|
| KR | 10-2006-0064485 | 6/2006 |
| WO | 2009/111457 | 9/2009 |

OTHER PUBLICATIONS

Hisham Mahmoud et al., "An efficient initial ranging algorithm for WiMAX (802.16e) OFDMA", Computer Communications vol. 32, (2009), pp. 159-168.

H. M. Alnuweiri et al., "OFDMA-Based Medium Access Control for Next-Generation WLANs" EURASIP Journal on Wireless Communications and Networking, vol. 2009, Article ID 512865, pp. 1-9, Received Aug. 4, 2008, Revised Dec. 6, 2008, Accepted Jan. 18, 2009.

International Search Report of International Application No. PCT/KR2010/005524, dated Aug. 26, 2011.

* cited by examiner

Fig. 7

OFDM-BASED MULTIPLE ACCESS METHOD AND COMMUNICATION DEVICE CONTROLLING THE SAME

TECHNICAL FIELD

The present invention relates to a multiple access method based on orthogonal frequency division multiplexing (hereinafter referred to as "OFDM") and a communication device controlling the same, and more particularly to an OFDM-based multiple access method and a communication device controlling the same, which can widely applied to a multiple access service field based on OFDM, such as Wi-Fi (Wireless Fidelity), WiMax (World Interoperability for Microwave Access), and Wibro (Wireless broadband internet).

BACKGROUND ART

An OFDM method is a method that has been widely adopted as the standard in the fourth generation communication field, such as IEEE 802.11 and IEEE 802.16, including a broadcasting field.

Further, it is well known that synchronization of terminals in the OFDM-based multiple accesses is very important. If non-synchronized terminals simultaneously transmit data through different subcarrier waves, interferences ICI occur between neighboring subcarriers to deteriorate the communication efficiency.

Figure 1:
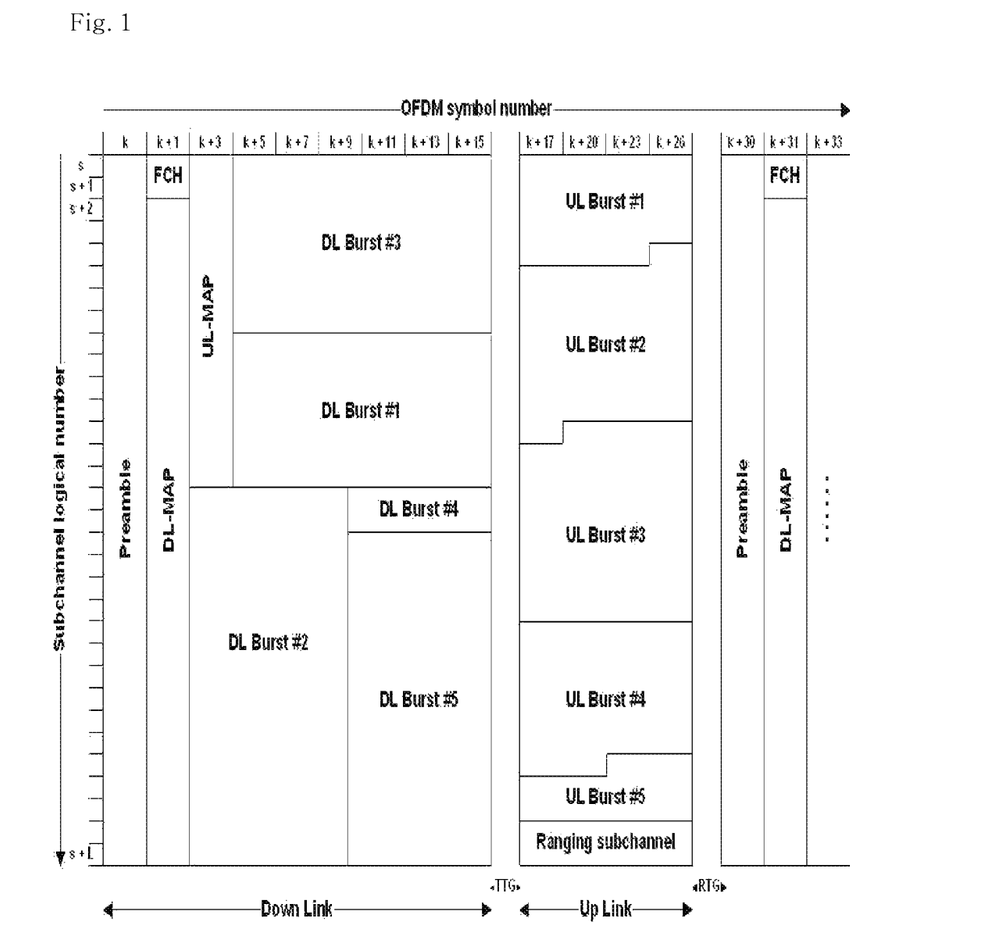
FIG. 1 is a table showing a MAC protocol of the IEEE 802.16a standard (WiMax).

Accordingly, in the MAC layer of IEEE 802.16a standard (WiMax), as illustrated in FIG. 1, ranging sub-channels for synchronization of the terminals have been prescribed.

The ranging sub-channels are provided so that (i) a terminal that firstly accesses the system obtains the synchronization, (ii) the synchronization is periodically re-adjusted even while the service is being provided, and (iii) the ranging sub-channels are used when the terminal requests resource allocation from a base station. The synchronization is performed to match the timing synchronization of received signals of all terminals by estimating timing offsets of the signals received from the respective terminals and adjusting the transmission time points of the respective terminals put in different positions based on the result of estimation.

However, there is a problem that the use of the ranging sub-channels is not always made successfully. For example, if a plurality of users intend to simultaneously perform symbol transmission through the ranging sub-channels or intend to perform symbol transmission with partial overlapping, such intentions may all fail.

As the system users are increased, such problems become severer.

To cope with this, two persons including Hisham A. Mahmoud have announced an algorithm that can improve the transmission efficiency when an initial ranging is attempted through a treatise "An efficient initial ranging for WiMAX (802.16e) OFDMA" announced in "2009 Computer Communications". Although this algorithm presented in the treatise results in the great improvement as compared with the WiMAX protocol in the related art, it shows simulation results in that a transmission failure of about 25% occurs when 10 users randomly attempt initial ranging.

Considering that portable internet users are explosively increasing due to popularization of smart phones, overhead for synchronization of terminal is expected to be further increased.

Further, since if the initial ranging task fails, the symbol transmission for synchronization is to be continuously attempted until the time synchronization matches, the overhead for the initial ranging work to match the time synchronization is accumulated and is further increased.

This problem appears in the IEEE 802.11 WLAN that is a system using a CSMA/CA MAC mechanism as the MAC layer in addition to the WiMax using the OFDMA as the MAC layer.

That is, the CSMA/CA MAC mechanism enables only one user to use the resources during the symbol period, senses whether the transmission channel is in use, and permits competitive use of the resources.

Accordingly, the CSMA/CA MAC mechanism is also difficult to solve the users' demands explosively increasing, and overhead accompanying this becomes quite large.

DISCLOSURE

Technical Problem

The present invention has been made to solve the above-mentioned problems occurring in the related art, and an object of the present invention is to reduce the overhead that is required to match the time synchronization, and greatly improve data throughput to match the time synchronization at once even if a large number of users perform accesses.

Another object of the present invention is to enable a large number of users to simultaneously use the system through removal of the interferences between subcarrier waves when a plurality of users simultaneously use a plurality of sub-channels even in an asynchronous mechanism.

Technical Solution

In order to achieve the above objects, according to an aspect of the present invention, there is provided an OFDM-based multiple access method, which includes transmitting a predetermined synchronization control signal to many and unspecified terminals, and receiving a test message from the terminals in response to the synchronization control signal; classifying the terminals that receive the test message in a first unit time from a predetermined reference time after the transmission of the synchronization control signal into a first group, and classifying the terminals that receive the test message in a certain n-th unit time from the reference time into an n-th group; allocating use permission time of sub-channels to the groups; and the terminals transmitting/receiving data through partial occupation of the sub-channels and symbols at a time allocated to the corresponding groups.

The step of the terminals transmitting/receiving data through partial occupation of the sub-channels and symbols at the time allocated to the corresponding groups may include the terminals requesting occupation of the sub-channels at the time allocated to the corresponding group; transmitting the sub-channels and symbol information that the terminals are to use in response to the request for the sub-channels; and the terminals transmitting/receiving the data through the permitted sub-channels and symbols.

The step of the terminals transmitting/receiving data through partial occupation of the sub-channels and symbols at the time allocated to the corresponding groups may include the terminals sensing whether the sub-channels and symbols are occupied at the time allocated to the corresponding groups, and transmitting/receiving the data to the sub-channels and symbols when the sub-channels and symbols are not occupied.

The reference time may be a transmission time of the synchronization control signal.

The reference time may be determined as a reception time point of the test message that is most rapidly received after the transmission of the synchronization control signal.

The reference time may be determined as a time point when only a predetermined time has elapsed based on the transmission time of the synchronization control signal.

The synchronization control signal may be a beacon.

The unit time may be determined as one of times that are equal to or shorter than cyclic prefix.

According to another aspect of the present invention, there is provided a communication device for controlling OFDM-based multiple accesses, which includes a transmitting/receiving unit transmitting a predetermined synchronization control signal to many and unspecified terminals, and receiving a test message from the terminals in response to the synchronization control signal; and a control unit classifying the terminals that receive the test message in a first unit time from a predetermined reference time after the transmission of the synchronization control signal into a first group, classifying the terminals that receive the test message in a certain n-th unit time from the reference time into an n-th group, allocating use permission time of sub-channels to the groups; and controlling the terminals to transmit/receive data through partial occupation of the sub-channels and symbols at a time allocated to the corresponding groups.

Advantageous Effects

According to the present invention, the overhead for the time synchronization is greatly reduced in comparison to the WiMAX in the related art, and thus the data throughput and the number of users who simultaneously use the service can be greatly increased. Further, even in comparison to the wireless LAN technique in the related art, since the use efficiency of the transmission channels is increased and the probability of collision that occurs during the simultaneous transmission is reduced, it becomes possible to provide a service to a plurality of users.

MODE FOR INVENTION

Hereinafter, preferred embodiments of the present invention will be described in detail with reference to the accompanying drawings.

Figure 2:
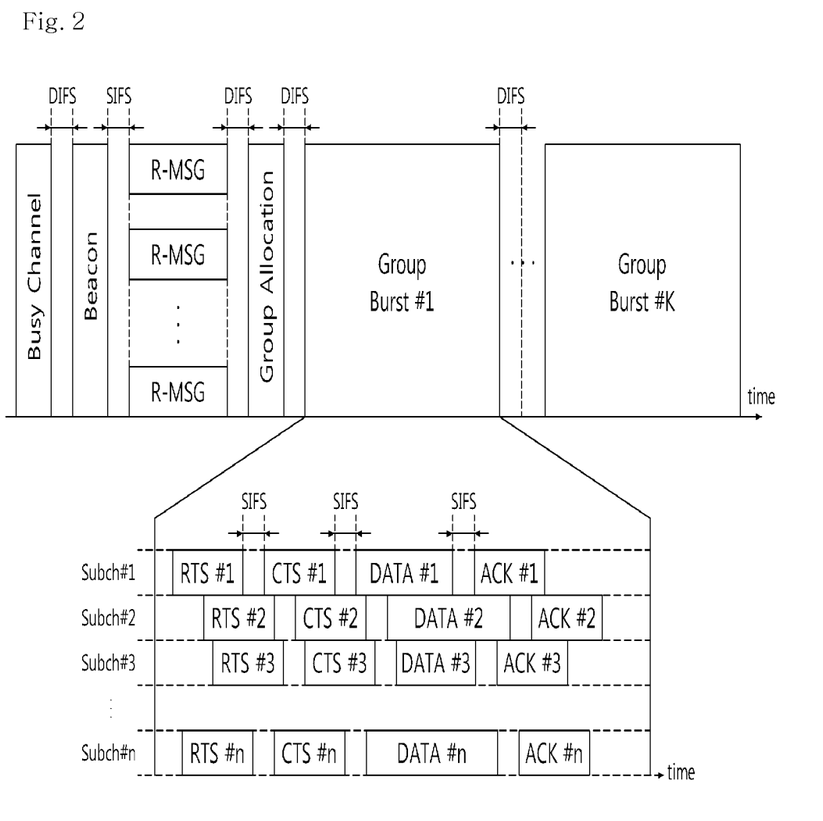
FIG. 2 is a table showing a MAC protocol according to a first embodiment of the present invention.
Figure 3:
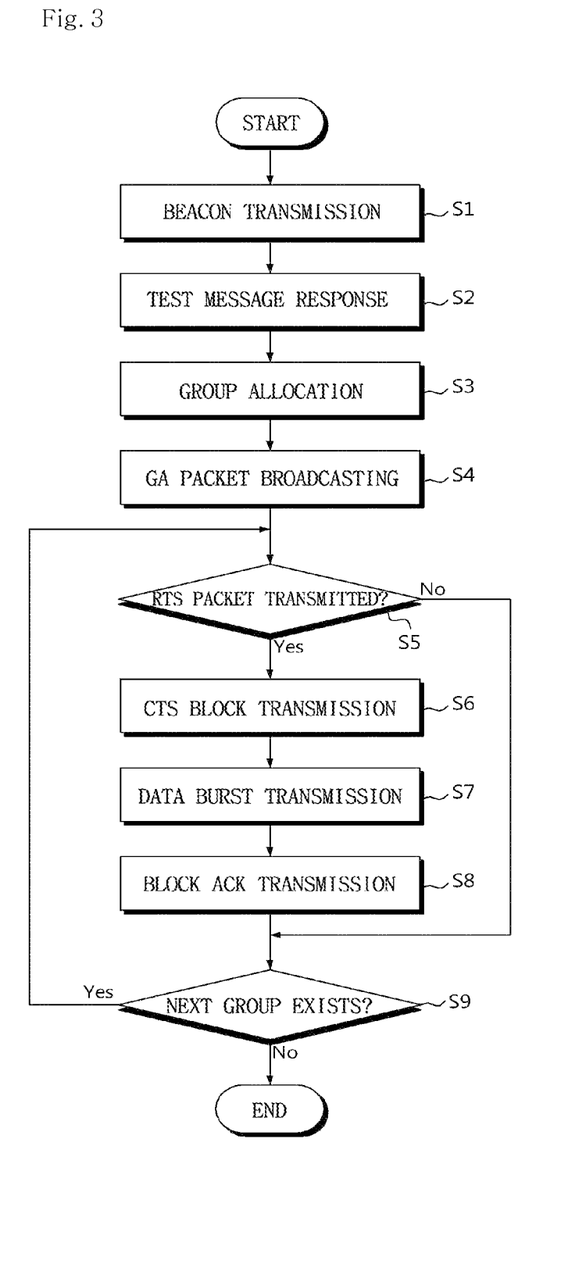
FIG. 3 is a flowchart illustrating a MAC-based multiple access method of FIG. 2.

FIG. 2 is a table showing a MAC protocol according to a first embodiment of the present invention, and FIG. 3 is a flowchart illustrating a MAC-based multiple access method of FIG. 2.

Referring to FIGS. 2 and 3, a multiple access method according to the first embodiment of the present invention starts when a base station or an SP (Access Point) transmits beacons to many and unspecified terminal in a coverage (S1).

Terminals that have received the beacons in the coverage transmit a test message R-MSG to the base station or the AP (hereinafter referred to as the "Base station") in response (S2). At this time, the respective terminals transmit the R-MSG through selection of certain sub-channels or subcarrier waves.

The base station checks the reception time of the R-MSG, and classifies the terminals that have transmitted the R-MSG into several groups according to the reception time (S3).

At this time, the terminals may classify the terminals into several groups considering cyclic prefix (hereinafter referred to as "CP") as a reference unit for applying the reception time.

Figure 4:
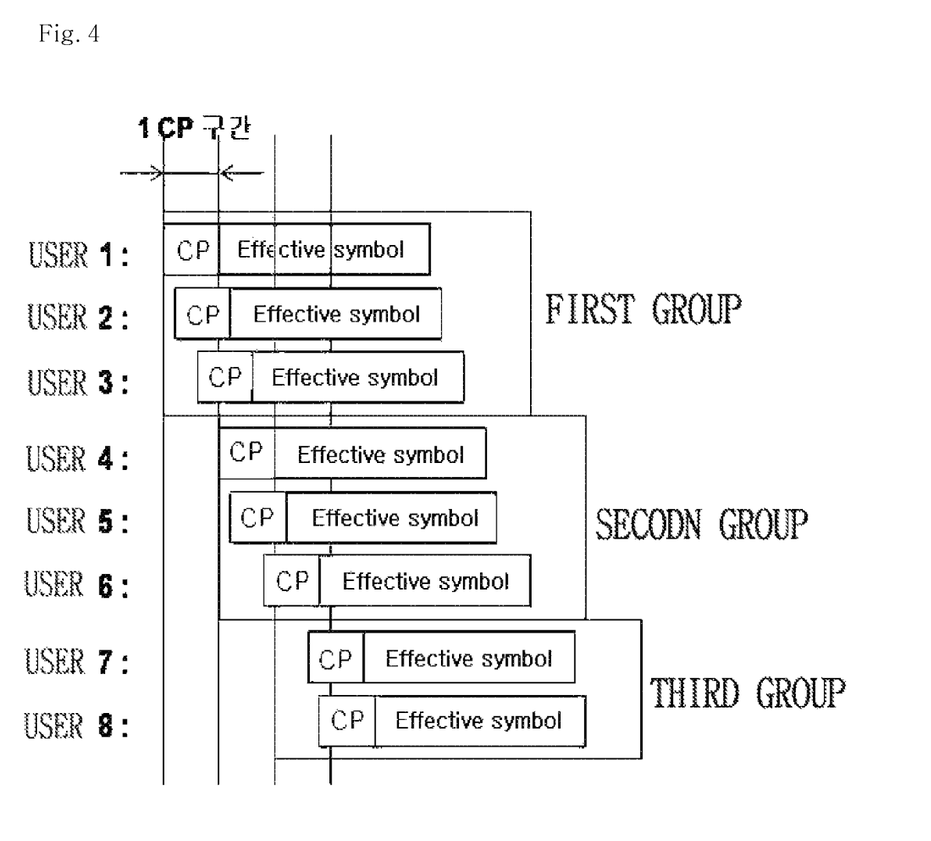
FIG. 4 is a schematic graph showing a method for classifying the terminals into groups through division of the reception time in CP unit according to the first embodiment of the present invention.

For example, as illustrated in FIG. 4, the terminals that receive the R-MSG in one CP based on the predetermined reference time are classified into a first group. In similar method, the terminals that receive the R-MSG in the n-th CP are classified into the n-th group.

Here, the reference time may be determined as a transmission time of the beacon, as a reception time of the first R-MSG, or as a time point when a predetermined time has elapsed from the transmission time of the beacon. This can be selectively adopted in determining the standard of the system. However, in the first embodiment, the reference time is selected as the transmission time of the beacon.

By usefully managing the groups through classification of the respective terminals using the CP as the reference unit, multiple access interferences do not occur between the symbols of the terminals received in the same CP period in the case where different subcarrier waves are used, and thus by allocating the transmission permission time by respective groups, the multiple access interference can be removed.

Next, if the group classification is completed, the base station broadcasts the designated group information to all terminals in the transmission range through the GA (Group Allocation) packet (S4). This packet includes allocation group information of the respective terminals, and also includes information of sub-channels through which the respective terminals transmit RTS (Request To Send) packets for the resource reservation.

The respective group have predetermined time, order, or timing to use the sub-channels and symbols. Accordingly, the terminals belonging to the first group are permitted to transmit data burst only at a time permitted to the first group, and the terminals belonging to the n-th group are permitted to transmit data burst at a time permitted to the n-th group.

In each group, the terminals send/receive control signals to be allocated with the time to transmit the data burst, that is, to be reserved and allocated with the resources.

For this, the terminal transmits the RTS packet to the base station through the sub-channel for RTS transmission that is allocated through the GA packet (S5). If there is no TRS transmission for a predetermined q symbol periods, the next group starts the RTS transmission after a predetermined time has elapsed.

If the number of terminals is larger than the number of sub-channels, the terminal is unable to monopolize the sub-channel. Accordingly, in the case where a plurality of terminals share one sub-channel, the TRS packet is transmitted through random selection of one symbol using IEEE 802.11 back off algorithm for a certain q symbol period in order to prevent the collision between the terminals.

The base station notifies of the sub-channel and the symbol to transmit the data burst through the block CTS (Clear To Send) in response to the TRS packet (S6).

Then, the respective terminals transmit data bursts #1 to n through the allocated sub-channels and symbols (S7).

After transmitting the data burst, the base station notifies of the result of the reception through a block ACK after the SIFS (S8).

After the transmission of the block ACK, the terminals belonging to the second group perform resource reservation and allocation after the SIFS, and perform data burst and block ACK transmission. This procedure is repeated until the n-th group (S9), and after an opportunity to sequentially transmit the data burst to all the groups is given, a procedure of updating the group classification of the terminals, such as reception of test message R-MSG from the terminals in the coverage, may be resumed.

In order to compare the performances of the multiple access methods according to the first embodiment of the present invention as described above referring to FIGS. 2 and 3, the inventors performed simulations in a wireless LAN environment.

The simulation was performed through comparison and analysis of the DCF and RTS/CTS technique of IEEE 802.11 and N-OFDMA technique of "OFDMA-based Medium Access Control for next-generation WLANs" announced by H. M Alnuweiri at al in 2009 through ERASIP Journal on Wireless Comm. and Networks.

In the simulation, indexes used in IEEE 802. 11a[2] were used, and the length 1 was fixed to 8. According to the standard, the transmission radius was 400 m, the number of sub-carriers was 64, and the CP period was 0.8 μs. However, the CP period of the N-OFDM, which solves the inter-symbol time delay problem with long CP, was fixed to 2.7 μs to support the terminal located in 400 m.

Figure 5:
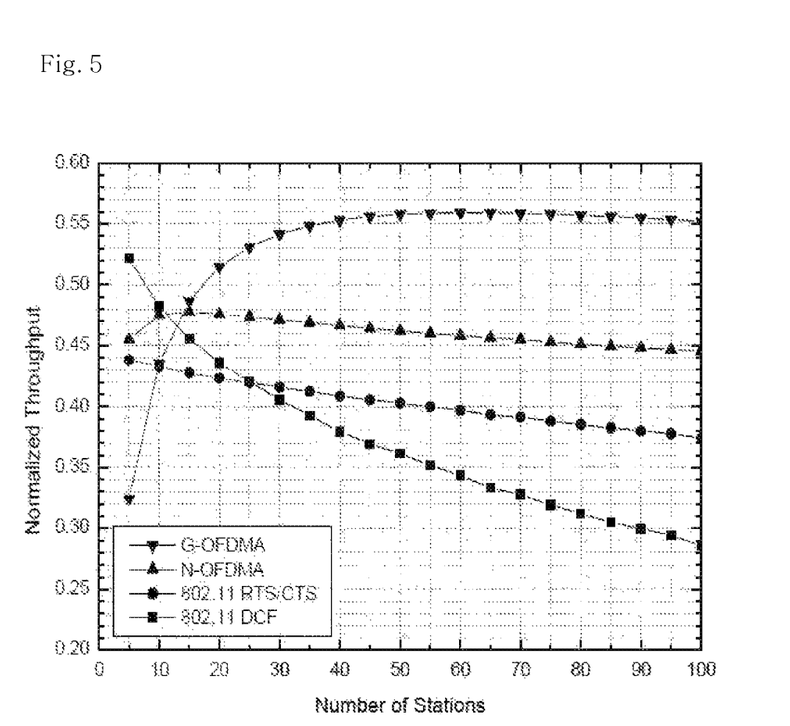
FIG. 5 is a graph showing the result of comparison of wireless LAN throughputs according to the number of terminals.

FIG. 5 shows the result of comparison of wireless LAN throughputs according to the number of terminals.

In the case where the number of terminals is small due to the transmission of the R-MSG and the control packet such as the GA packet in order to obtain the respective terminal synchronization, a period where partial throughput become small exists, but as the number of terminals exceeds 15, it can be confirmed that the multiple access method (G-OFDMA) according to the first embodiment of the present invention has a superior performance in comparison to other techniques. This is because the number of control packets is reduced by transmitting the block CTS/ACK due to the advantage that the transmission is performed in a wireless LAN environment having no multiple access interference, and at the same time, a gain is obtained through transmission of the data packet of the terminal that succeeds in the RTS transmission.

Although the simulation was performed in the wireless LAN environment, further improvement of the efficiency of data throughput can be expected as the number of terminals is increased even in Wibro/WiMax.

According to the first embodiment of the present invention as described above, a beacon is used as the synchronization control signal for the terminals in the coverage to transmit the test message. However, this is merely exemplary, and it may be defined by another predetermined packet.

Further, according to the first embodiment, the classification of the terminals into the group is performed based on which CP the test message is received in after the reference time. However, it is also possible to apply the first embodiment based on a certain unit time that corresponds to the CP instead of the CP. For example, the unit time may be set to be equal to CP or to be shorter than the CP.

Accordingly, the first embodiment of the present invention as described above should be understood as exemplary, and it is to be noted that various modification can be made without deviating from the technical idea of the present invention.

Figure 6:
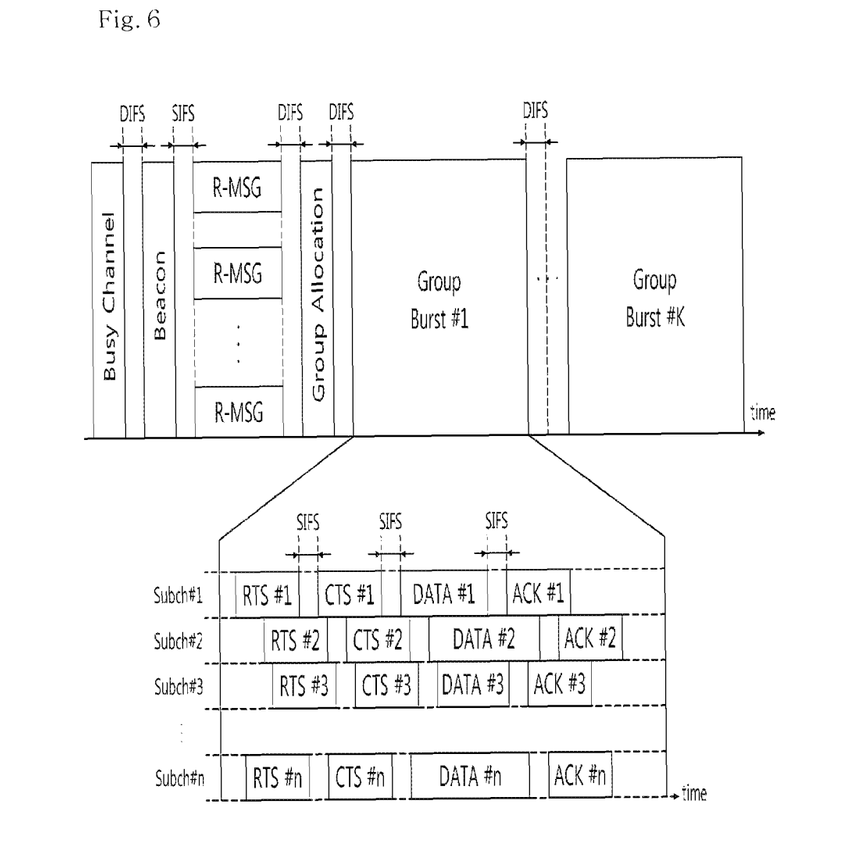
FIG. 6 is a table showing a MAC protocol according to a second embodiment of the present invention.
Figure 7:
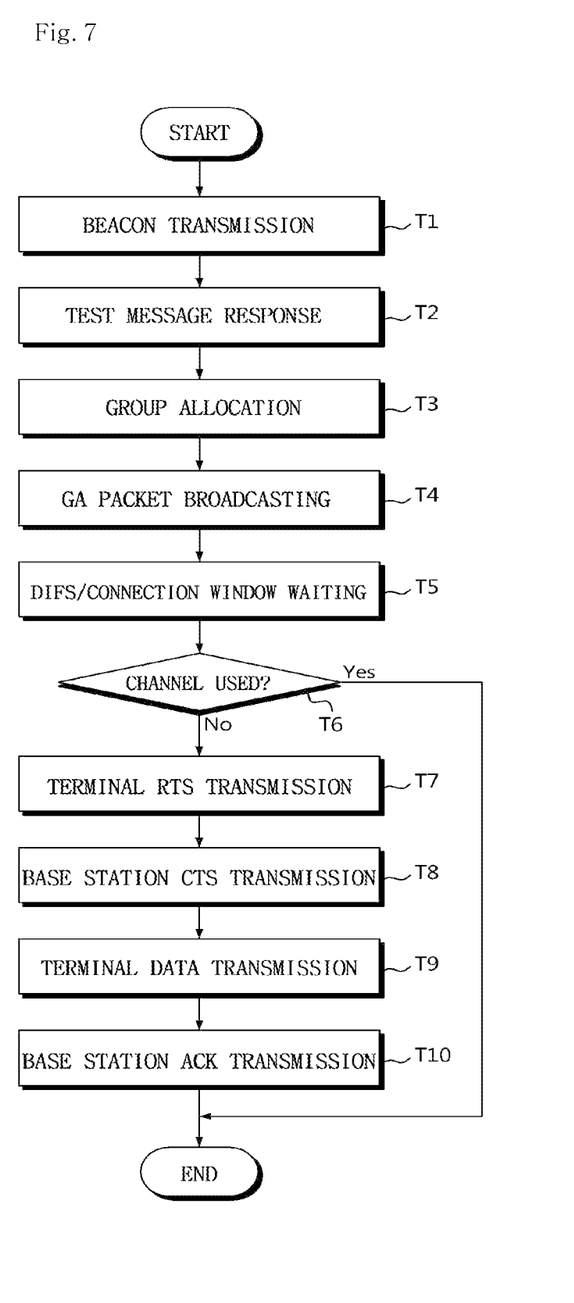
FIG. 7 is a flowchart illustrating a MAC-based multiple access method of FIG. 6.

FIG. 6 is a table showing a MAC protocol according to a second embodiment of the present invention, and FIG. 7 is a flowchart illustrating a MAC-based multiple access method of FIG. 6.

Referring to FIGS. 6 and 7, it can be known that the second embodiment of the present invention is similar to the first embodiment until the time reaches the group allocation (T1 to T4).

In the groups, the time or order, in which the terminals belonging to the respective groups can use the sub-channels, is allocated, and through the GA packet, the respective terminals is designated with the group to which the terminals belong and access-permitted sub-packets.

After receiving the GA packet, the terminals belonging to the first group first attempt to use the sub-channels (T5 to T10).

In the case where the terminals intend to transmit the data burst, they confirm whether the access-permitted sub-channels are used by other terminals, and if the sub-channels are vacant, they transmit the data burst through the corresponding sub-channels. At this time, the CSMA/CA method or RTS/CTS method, which is the IEEE 802.11 MAC protocol, may be used, and in this embodiment, the RTS/CTS method, which is advantageous for solving the problem of hidden terminals that do not receive the wireless transmission signals of other users, is used.

Accordingly, the following explanation is to be noted on the point that it is the process performed in parallel by sub-channels.

First, the terminal waits for a predetermined interval (DIFS+contention window) to confirm whether the access-permitted sub-channel is used by other terminals (T5).

If other terminals use the sub-channel, the terminal waits for until the whole data transmission is finished, and after a predetermined time, the terminal transmits the RTS. Accordingly, the terminal can use the sub-channel only at a time permitted to the first group.

If other terminals do not use the sub-channel (T6), the terminal transmits the RTS to the base station (T7), receives the CTS from the base station (T8), transmits the data (T9), and receives the ACK from the base station (T10) to terminate the data transmission/reception.

Each terminal commonly uses the designated sub-channel with a plurality of terminals, and at the same time, interferences between other terminals in the same group that transmit the data through different sub-channels can be avoided.

In the sub-channel, it is also possible to use the CSMA/CA method instead of the RTS/CTS method.

The above-described process is performed in the respective sub-channels, and even if all the terminals in the corresponding group are unable to transmit the data burst, the terminals of the next group start to use the channel after somewhat interval when the time permitted to the group is ended.

The first embodiment of the present invention as described above may be more efficient than the second embodiment on the point that the base station can process the CTS and ACK as a block and the sub-channels can be reserved and allocated.

However, according to the second embodiment of the present invention, the group allocation method can be utilized in the MAC protocol of IEEE 802.11.

In the first and second embodiments, the base station includes the communication device in which the plurality of terminals transmit/receive data through the multiple access based on the OFDM, and the AP (Access Point) and a repeater are included.

It will apparent to those skilled in the art that the functions of the base station as described above according to the first and second embodiments can be implemented by the control unit that includes wired/wireless transmission/reception module and various kinds of software and processors required to control the communication according to the MAC protocol. Accordingly, the detailed description of the communication device of the base station that performs the multiple access method as described above according to the embodiment of the present invention will be omitted.

Up to now, some embodiments of the present invention have been described.

However, the above-described embodiments of the present invention are merely exemplary, and cannot limit the scope of the present invention. It will be understood by those skilled in the art that modifications of the embodiments are sufficiently possible without departing from the scope of the present invention.

For example, in transmitting the test message, the respective terminals may select and transmit certain subcarriers, and it is possible to use a simple modulation method such as QPSK to prevent the collision between the terminals.

Further, in the second embodiment, it is also possible that the GA packet enables the respective terminals to confirm whether the respective terminals randomly use and access the sub-channels without designating the sub-channel information to be accessed.

Accordingly, the scope of the present invention is defined by the appended claims rather than the detailed description as described above, and it will be construed that all corrections and modifications derived from the meanings and scope of the following claims and the equivalent concept fall within the scope of the present invention.

The invention claimed is:

1. An OFDM-based multiple access method comprising:
   transmitting a predetermined synchronization control signal to many and unspecified terminals, and receiving a test message from the terminals in response to the synchronization control signal;
   classifying the terminals that receive the test message in a first unit time from a predetermined reference time after the transmission of the synchronization control signal into a first group, and classifying the terminals that receive the test message in a certain n-th unit time from the reference time into an n-th group;
   allocating use permission time of sub-channels to the groups; and
   the terminals transmitting/receiving data through partial occupation of the sub-channels and symbols at a time allocated to the corresponding groups,
   wherein the unit time is determined as one of times that are equal to or shorter than cyclic prefix.

2. The OFDM-based multiple access method of claim 1, wherein the step of the terminals transmitting/receiving data through partial occupation of the sub-channels and symbols at the time allocated to the corresponding groups, comprises:
   the terminals requesting occupation of the sub-channels at the time allocated to the corresponding group;
   transmitting the sub-channels and symbol information that the terminals are to use in response to the request for the sub-channels; and
   the terminals transmitting/receiving the data through the permitted sub-channels and symbols.

3. The OFDM-based multiple access method of claim 1, wherein the step of the terminals transmitting/receiving data through partial occupation of the sub-channels and symbols at the time allocated to the corresponding groups, comprises:
   the terminals sensing whether the sub-channels and symbols are occupied at the time allocated to the corresponding groups, and transmitting/receiving the data to the sub-channels and symbols when the sub-channels and symbols are not occupied.

4. The OFDM-based multiple access method of claim 1, wherein the reference time is a transmission time of the synchronization control signal.

5. The OFDM-based multiple access method of claim 1, wherein the reference time is determined as a reception time point of the test message that is most rapidly received after the transmission of the synchronization control signal.

6. The OFDM-based multiple access method of claim 1, wherein the reference time is determined as a time point when only a predetermined time has elapsed based on the transmission time of the synchronization control signal.

7. The OFDM-based multiple access method of claim 1, wherein the synchronization control signal is a beacon.

8. A communication device for controlling OFDM-based multiple accesses, comprising:
   a transmitting/receiving unit transmitting a predetermined synchronization control signal to many and unspecified terminals, and receiving a test message from the terminals in response to the synchronization control signal; and
   a control unit classifying the terminals that receive the test message in a first unit time from a predetermined reference time after the transmission of the synchronization control signal into a first group, classifying the terminals that receive the test message in a certain n-th unit time from the reference time into an n-th group, allocating use permission time of sub-channels to the groups; and controlling the terminals to transmit/receive data through partial occupation of the sub-channels and symbols at a time allocated to the corresponding groups,
   wherein the unit time is determined as one of times that are equal to or shorter than cyclic prefix.

* * * * *